(12) United States Patent
Whittaker

(10) Patent No.: US 11,997,214 B2
(45) Date of Patent: May 28, 2024

(54) SEPARATING THE AUTHORIZATION OF CONTENT ACCESS AND CONTENT DELIVERY USING MULTIPLE CRYPTOGRAPHIC DIGITAL SIGNATURES

(71) Applicant: Google LLC, Mountain View, CA (US)

(72) Inventor: Colin Whittaker, Newton, MA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 17/598,188

(22) PCT Filed: Mar. 26, 2019

(86) PCT No.: PCT/US2019/024103
§ 371 (c)(1),
(2) Date: Sep. 24, 2021

(87) PCT Pub. No.: WO2020/197545
PCT Pub. Date: Oct. 1, 2020

(65) Prior Publication Data
US 2022/0166633 A1   May 26, 2022

(51) Int. Cl.
*H04L 9/32*       (2006.01)
*G06F 21/10*      (2013.01)

(52) U.S. Cl.
CPC ................... *H04L 9/3247* (2013.01)

(58) Field of Classification Search
CPC ............. H04L 9/3247; G06F 21/1087; G06F 21/1083; G06F 21/10
(Continued)

(56) References Cited

U.S. PATENT DOCUMENTS 6,629,150 B1 *   9/2003   Huded ............... G06F 21/64
                                               707/999.004
10,333,716 B2 *  6/2019   Blinn ................. H04L 63/00
(Continued)

FOREIGN PATENT DOCUMENTS

JP   2003122724 A   4/2003
JP   2004280401 A   10/2004
(Continued)

OTHER PUBLICATIONS

Overview of Device Access Control in the IoT and its Challenges, Beltran et al., 2018 (Year: 2018).*
(Continued)

*Primary Examiner* — Jahangir Kabir
(74) *Attorney, Agent, or Firm* — Lowenstein Sandler LLP

(57) ABSTRACT

A first request for content from a client device is received. The first request includes a resource locator provided by an authorizing data service to authorize the client device to obtain the requested content. The resource locator includes a first digital signature associated with authorization of the client device to access the requested content, and a second digital signature associated with authorization of delivery of the requested content for access by the client device. An occurrence of an event is identified that indicates a change in the delivery of the requested content to the client device. A third digital signature associated with a changed delivery of the requested content is generated. A new resource locator is provided to the client device that includes the first digital signature and the third digital signature.

20 Claims, 7 Drawing Sheets

(58) Field of Classification Search
USPC .......................................................... 726/22
See application file for complete search history.

(56) References Cited

U.S. PATENT DOCUMENTS

| | | | |
|---|---|---|---|
| 10,812,353 B2* | 10/2020 | Balupari | ............. H04L 43/0876 |
| 2003/0014503 A1 | 1/2003 | Legout | |
| 2014/0359064 A1 | 12/2014 | Rizzo | |
| 2017/0134356 A1* | 5/2017 | Oyman | ................... H04L 67/02 |
| 2017/0195340 A1* | 7/2017 | Wang | ................... H04L 63/0846 |

FOREIGN PATENT DOCUMENTS

| | | | |
|---|---|---|---|
| JP | 2005027009 A | 1/2005 |
| JP | 2007081461 A | 3/2007 |
| JP | 2010020480 A | 1/2010 |
| JP | 2017173889 A | 9/2017 |

OTHER PUBLICATIONS

European Search Report and Written Opinion dated May 31, 2023, on application No. 23157876.6-1218.
International Search Report and Written Opinion on application No. PCT/US2019/024103 dated Feb. 12, 2019.
Office Action for Japanese Patent Application No. 2023001877, mailed Mar. 25, 2024, 06 Pages.

* cited by examiner

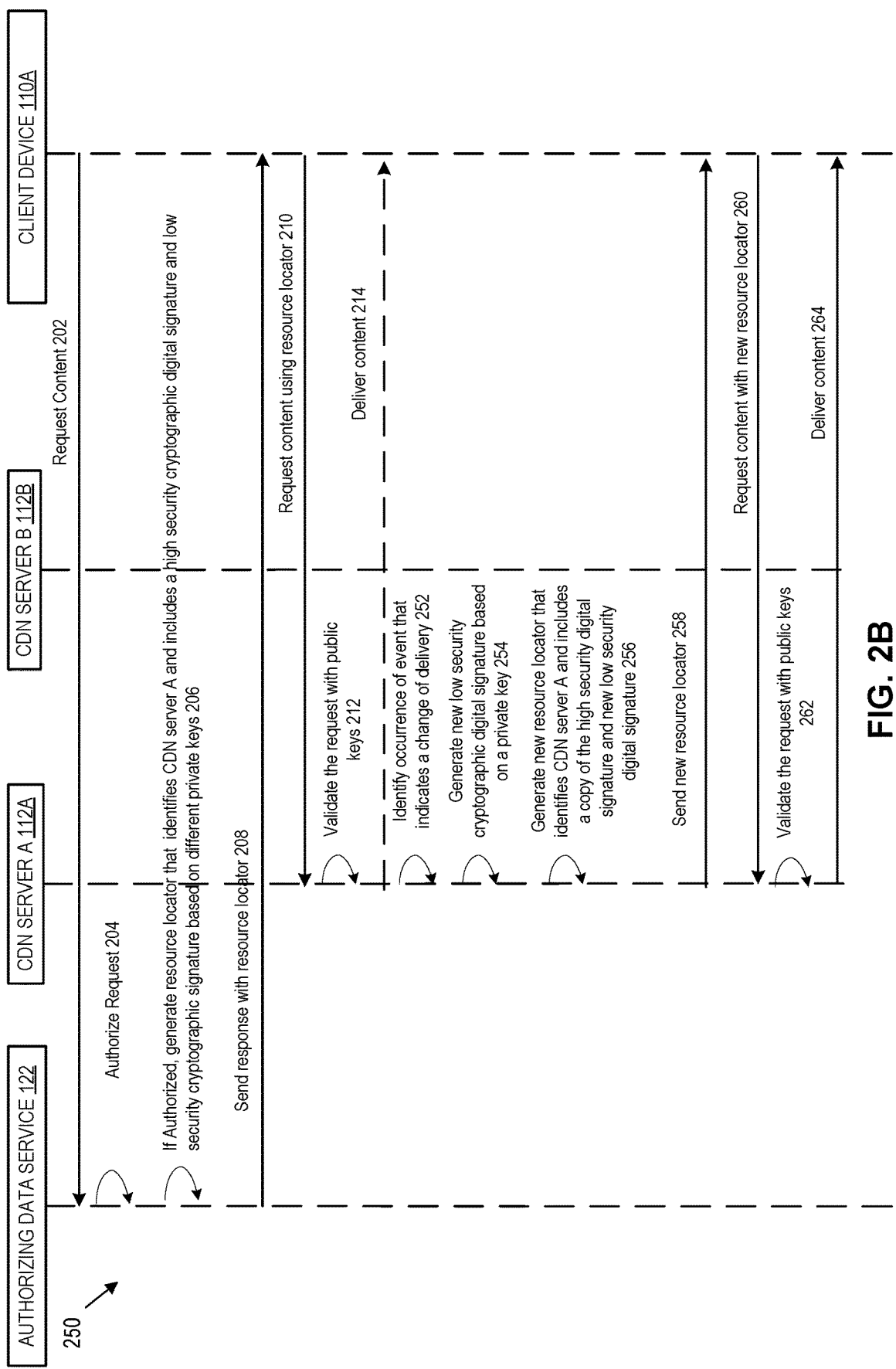

Resource locator 400

| https:// | Server A CDN ... | HSParam A=Value 1, HSParam B=Value 2,...<br>LSParam X=Value 4, LSParam Y=Value 5,... | High Security<br>Param=A, B,... | High Security<br>Signature #1 | Low Security<br>Param=X, Y,... | Low Security<br>Signature #2 |
|---|---|---|---|---|---|---|
| 402 | 404 | 406 | 408 | 410 | 412 | 414 |

FIG. 4A

Resource locator 430

| https:// | Server B CDN ... | HSParam A=Value 1, HSParam B=Value 2,...<br>LSParam X=Value 6, LSParam Y=Value 7,... | High Security<br>Param=A, B,... | High Security<br>Signature #1 | Low Security<br>Param=X, Y,... | Low Security<br>Signature #3 |
|---|---|---|---|---|---|---|
| 402 | 434 | 436 | 408 | 410 | 412 | 444 |

FIG. 4B

Resource locator 460

| https:// | Server A CDN ... | HSParam A=Value 1, HSParam B=Value 2,...<br>LSParam X=Value 8, LSParam Y=Value 9,... | High Security<br>Param=A, B,... | High Security<br>Signature #1 | Low Security<br>Param=X, Y,... | Low Security<br>Signature #4 |
|---|---|---|---|---|---|---|
| 402 | 404 | 466 | 408 | 410 | 412 | 474 |

FIG. 4C

SEPARATING THE AUTHORIZATION OF CONTENT ACCESS AND CONTENT DELIVERY USING MULTIPLE CRYPTOGRAPHIC DIGITAL SIGNATURES

TECHNICAL FIELD

Aspects and embodiments of the disclosure relate to content sharing platforms, and more specifically, to using multiple cryptographic digital signatures to separate authorization of content access and content delivery.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

An aspect of the disclosure provides a method comprising: receiving, by a first server of a content distribution network (CDN), a first request for content from a client device, wherein the first request comprises a resource locator provided by an authorizing data service to authorize the client device to obtain the requested content, the resource locator identifying the first server to deliver the requested content to the client device, and comprising a first digital signature associated with authorization of the client device to access the requested content, and a second digital signature associated with authorization of delivery of the requested content for access by the client device; identifying an occurrence of an event that indicates a change in the delivery of the requested content for access by the client device; responsive to identifying the occurrence of the event, generating a third digital signature associated with a changed delivery of the requested content for access by the client device; and providing a new resource locator to the client device, the new resource locator comprising the first digital signature associated with authorization of the client device to access the requested content and the third digital signature associated with the changed delivery of the requested content for access by the client device, wherein the client device is operative to access the content using the new resource locator.

A further aspect of the disclosure provides a system comprising: a memory; and a processing device, coupled to the memory, the processing device to perform a method according to any aspect or embodiment described herein. A further aspect of the disclosure provides a computer program product (such as a tangible computer-readable medium or a software product which can be downloaded without necessarily being stored for a non-transitory way) comprising instructions that, responsive to execution by a processing device, cause the processing device to perform operations comprising a method according to any aspect or embodiment described herein

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 2B is a diagram of operations for changing the delivery of content to a client device by a content distribution network using digital signatures, in accordance with embodiments of the disclosure.

FIGS. 4A-4C show diagrams that illustrate resource locators, in accordance with embodiments of the disclosure.

DETAILED DESCRIPTION

Figure 1:
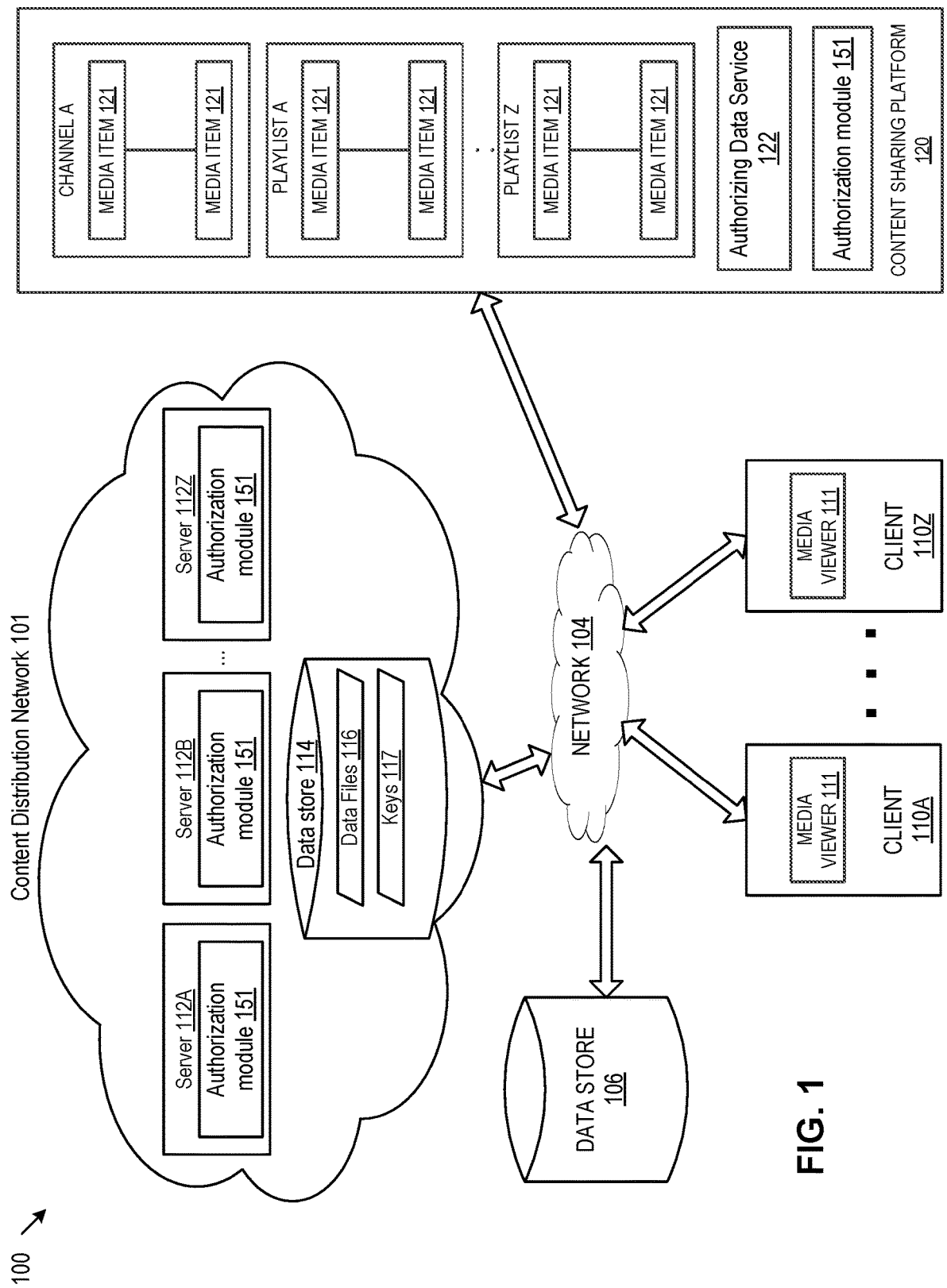
FIG. 1 illustrates an example system architecture, in accordance with an embodiment of the disclosure.

A content sharing platform (also referred to as a "content delivery platform" herein) may offer content, such as video items, audio items, or gaming items, to users via user devices. A user may log in to a user account associated with the content sharing platform to access the content sharing platform and upload and/or consume the content. The content sharing platform may use a content distribution network (CDN) (also referred to as a "content delivery network" herein) to deliver the content to client devices. A CDN can include a geographically distributed network of servers that work together to provide high availability and high performance in the delivery of content. For example, server A of the CDN that in a same geographical vicinity as client device A can be selected to deliver content to client device A. Content delivered by server A can be delivered to client device A faster than another server, server B of CDN, that is not located in the same geographical vicinity as client device A.

In some systems, a user, via a client device, requests content from a content sharing platform. The content sharing platform, using an authorization service, can authorize the user account associated with the user to determine whether the user has permission to access the requested content. If the user account is authorized to access the content, the content sharing platform can generate a resource locator (e.g., a uniform resource locator (URL)) that can be used by the client device to obtain the requested content from a CDN. To add a level of security to the resource locator, the content sharing platform can generate a cryptographic digital signature (also referred to as a "digital signature" herein) using a private key. The digital signature can be associated with authorization of the client device to access the requested content and authorization of the delivery of the requested content. The digital signature can be added to the resource locator. The digital signature can be based on signing parameters (e.g., expiration parameter, bit rate parameter, event identifier parameter, etc.), which are included in the resource locator and used to indicate to the CDN which data is to be served and how the data is to be served. The resource locator that includes the digital signature can be sent the client device. In order to obtain the requested content, the client device can send the resource locator to the CDN, and the CDN can validate the digital signature of the resource locator. If the digital signature is validated, the CDN can serve the content to the client device in accordance with the parameters (e.g., low security parameters can include the serving machine, the recommended bitrate, whether alternative protocols are permitted, and high security parameters can include video identifier, restrictions on where the video can be requested or served, and when the resource located will expire and become invalid) identified in the resource locator. If the digital signature is not validated, the resource locator may be compromised and the CDN does not deliver the content to the client device. The digital signature adds a level of security to content delivery, such that an entity is not able to change parameters of the resource locator or "spoof" the CDN to deliver the content.

In some situations, the CDN does validate a legitimate digital signature, and determines the server, identified in the resource locator, that should deliver content to the client device. However, an event can occur that may cause a change in delivery of the requested content to the client device. For example, the resource locator may identify server X of the CDN as the server to deliver the requested content to the client device but server X may be at capacity and unavailable to deliver the content to the client device. On the other hand, server Y of the CDN, which is not identified in the resource locator, may have capacity, but the CDN may not be permitted to reauthorize server Y to deliver the requested content because, for example, the CDN may run on untrusted or unsecured hardware resources. In particular, the CDN may not have authorization to generate a new resource locator that can redirect the client device to receive the content from server Y. To reauthorize the CDN to deliver the requested content from server Y, the content sharing platform may have to perform a reauthorization operation, including generating a new digital signature and adding the new digital signature to a new resource locator that identifies server Y as the delivering server. The new resource locator can be sent to the client device, and be used by the client device to access the requested content from server Y. Requesting the content sharing platform to generate a new resource locator with a new digital signature can add significant latency (100s of milliseconds) to the delivery of content from the CDN. In particular, the server of the content sharing platform that is hosting the authentication service can be physically far from the CDN server that is requesting the change in the delivery of the content. Also, performing reauthorization operations consumes significant computational, memory, and bandwidth resources of the content sharing platform.

Aspects of the disclosure address the above-mentioned and other challenges by using at least two digital signatures that are included in the resource locator. A first (high security) digital signature can be associated with authorization of the client device to access the requested content. A second (low security) digital signature can be associated with authorization of the delivery of the requested content to the client device. The content sharing platform can generate both the high security digital signature and the low security digital signature. The CDN has authorization to generate a new low security digital signature associated with authorization of the delivery of the requested content to the client device, but does not have authorization to generate a new high security digital signature associated with authorization to access the requested content. If the CDN identifies an event that may cause a change in delivery of the requested content to the client device, the CDN can generate a new resource locator with a new low security digital signature and the original high security digital signature to redirect the client device to receive the requested content from another CDN server, for example.

In embodiments, a client device associated with a user account can send a request for content to the content sharing platform. The content sharing platform can authorize the user account, and generate the high security digital signature and the low security digital signature using two different private keys. A resource locator that includes the high security digital signature and the low security digital signature can be sent to the client device by the content sharing platform. The client device can send the resource locator to the CDN to obtain the requested content. The CDN can validate the high security digital signature and low security digital signature, and if both are validated, can send the requested content to the client device. If an event occurs (before the requested content is provided to the client device) that indicates a change in the delivery of the requested content to the client device, the CDN can change one or more of the low security parameters (e.g., the serving machine, the recommended bitrate, and whether alternative protocols are permitted to communicate with and serve data to the client device) and generate a new low security digital signature associated with the changed delivery of the requested content. The CDN can create a new resource locator that identifies the changed delivery and include the original high security digital signature and the new low security digital signature in a new resource locator. The new resource locator can then be sent to the client device. The client device can use the new resource locator to access the requested content.

In some embodiments, the high security digital signature can be generated based on high security parameters. The low security digital signature can be based on low security parameters. The high security parameters and high security digital signature are "higher security" in the sense that the content sharing platform (e.g., the authorizing data service of the content sharing platform) retains control of the authorization of access to content. Controlling access to content is of "higher" priority than controlling the delivery of content. If, for example, a malicious actor were to gain control of the authorization to access content, the content sharing platform can suffer potentially irreparable damage. If, for example, a malicious actor were to gain control of the delivery of content, the content sharing platform may be temporality impaired but not suffer irreparable damage. The low security parameters are "lower security" in the sense that the content sharing platform and the content distribution network share control of the authorization to deliver content and in the sense that malicious use of the low security digital signature would not cause irreparable damage to the content sharing platform.

In embodiments, the use of both a high security digital signature and a low security digital signature gives greater flexibility to permit the CDN to authorize changes in delivery, while keeping authorization to access content controlled by the content sharing platform. Additionally, allowing the CDN to authorize the change in delivery of the requested content reduces latency in delivering the requested content to a client device at least because the CDN can reauthorize a change in delivery without requesting content sharing platform to perform the reauthorization.

As noted, a technical problem addressed by embodiments of the disclosure is the latency in delivering content to a client device caused by requesting the content sharing platform to reauthorize a change in the delivery of requested content. For example, to reauthorize a change in the delivery of the requested content, the content sharing platform performs a subsequent authorization operation and generates another digital signature and adds the new digital signature to a new resource locator. The content sharing platform can be a far distance from the CDN server requesting reauthorization, which can add significant latency (100s of milliseconds) to the delivery of content from the CDN.

As also noted, another technical problem addressed by embodiments of the disclosure is the reduced security by permitting the CDN to perform authorization using a single digital signature associated with both authorization to access content and authorization of delivery of content. For example, permitting the CDN to perform authorization where a single digital signature is used for both authorization to access content and authorization of delivery of content can expose the content sharing platform to irreparable malicious attacks.

As also noted, another technical problem addressed by embodiments of the disclosure is the consumption of significant computational, memory, and bandwidth resources by the content sharing platform in the performance of reauthorization operations.

A technical solution to the above identified technical problems may include: receiving, by a first server of a CDN, a request for content from a client device, wherein the first request includes a resource locator provided by an authorizing data service to authorize the client device to obtain the requested content, the resource locator identifying the first server to deliver the requested content to the client device, and including a first digital signature associated with authorization of the client device to access the requested content, and a second digital signature associated with authorization of delivery of the requested content for access by the client device; identifying an occurrence of an event that indicates a change in the delivery of the requested content for access by the client device; responsive to identifying the occurrence of the event, generating a third digital signature associated with a changed delivery of the requested content for access by the client device; and providing a new resource locator to the client device, the new resource locator including the first digital signature associated with authorization of the client device to access the requested content and the third digital signature associated with the changed delivery of the requested content for access by the client device, wherein the client device to access the content using the new resource locator.

Thus, the technical effect may include reducing the latency in delivering content to a client device caused by requesting the content sharing platform to reauthorize a change in the delivery of requested content.

Further technical effects may include improving the security of the content delivery by providing a resource locator with a high security digital signature and a low security digital signature.

Additional technical effects may include reducing the consumption of computational, memory, and bandwidth resources by the content sharing platform by allowing the CDN to perform authorization for changes in the delivery of the requested content.

FIG. 1 illustrates an example system architecture 100, in accordance with one embodiment of the disclosure. The system architecture 100 (also referred to as "system" herein) includes a content sharing platform 120 (also referred to a "content distribution platform" herein), a data store 106, client devices 110A-110Z (generally referred to as "client device(s) 110" herein) connected to a network 104, and a content distribution network (CDN) 101 (also referred to a "content delivery network" herein). The CDN 101 may include a plurality of server machines 112A-112Z (also referred to as "server(s) 112A-112Z" herein).

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In embodiments, data store 106 is a persistent storage that is capable of storing content items (such as media items) as well as data structures to tag, organize, and index the content items. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by content sharing platform 120 or one or more different machines coupled to the content sharing platform 120 via the network 104.

The client devices 110A-110Z may each include computing devices such as personal computers (PCs), laptops, mobile phones, smart phones, tablet computers, netbook computers, network-connected televisions, etc. In some embodiments, client devices 110A through 110Z may also be referred to as "user devices." In embodiments, each client device includes a media viewer 111. In one embodiment, the media viewers 111 may be applications that allow users to playback, view, or upload content, such as images, video items, web pages, documents, audio items, etc. For example, the media viewer 111 may be a web browser that can access, retrieve, present, or navigate content (e.g., web pages such as Hyper Text Markup Language (HTML) pages, digital media items, etc.) served by a web server. The media viewer 111 may render, display, or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application, or native application) that allows users to playback digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A-110Z by content sharing platform 120. For example, the media viewers 111 may be embedded media players that are embedded in web pages provided by the content sharing platform 120. In another example, the media viewers 111 may be applications that are downloaded from content sharing platform 120.

In one embodiment, the content sharing platform 120 or server machines 112A-112Z may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to media items or provide the media items to the user. For example, the content sharing platform 120 may allow a user to consume, upload, search for, approve of ("like"), disapprove of ("dislike"), or comment on media items. The content sharing platform 120 may also include a website (e.g., a webpage) or application back-end software that may be used to provide a user with access to the media items.

In embodiments of the disclosure, a "user" may be represented as a single individual. However, other embodiments of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z, of which only channel A is shown in FIG. 1). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some embodiments, media item 121 is also referred to as content or a content item.

For brevity and simplicity, rather than limitation, a video item, audio item, or gaming item are used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one embodiment, the content sharing platform 120 may store the media items 121 using the data store 106. In another embodiment, the content sharing platform 120 may store video items or fingerprints as electronic files in one or more formats using data store 106.

In one embodiment, the media items 121 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some embodiments, the media item can be streamed, such as in a live stream to one or more of client devices 110A-110Z. It may be noted that "streamed" or "streaming" refers to a transmission or broadcast of content, such as a media item, where the received portions of the media item may be played back by a receiving device immediately upon receipt (within technological limitations) or while other portions of the media content are being delivered, and without the entire media item having been received by the receiving device. "Stream" may refer to content, such as a media item, that is streamed or streaming. A live-stream media item may refer to a live broadcast or transmission of a live event, where the media item is concurrently transmitted, at least in part, as the event occurs to a receiving device, and where the media item is not available in its entirety.

In embodiments, content sharing platform 120 may allow users to create, share, view or use playlists containing media items (e.g., playlist A-Z, containing media items 121). A playlist refers to a collection of media items that are configured to play one after another in a particular order without any user interaction. In embodiments, content sharing platform 120 may maintain the playlist on behalf of a user. In embodiments, the playlist feature of the content sharing platform 120 allows users to group their favorite media items together in a single location for playback. In embodiments, content sharing platform 120 may send a media item on a playlist to client device 110 for playback or display. For example, the media viewer 111 may be used to play the media items on a playlist in the order in which the media items are listed on the playlist. In another example, a user may transition between media items on a playlist. In still another example, a user may wait for the next media item on the playlist to play or may select a particular media item in the playlist for playback.

In embodiments, the user may access content sharing platform 120 through a user account. The user may access (e.g., log in to) the user account by providing user account information (e.g., username and password) via an application on client device 110 (e.g., media viewer 111). In some embodiments, the user account may be associated with a single user. In other embodiments, the user account may be a shared account (e.g., family account shared by multiple users) (also referred to as "shared user account" herein). The shared account may have multiple user profiles, each associated with a different user. The multiple users may login to the shared account using the same account information or different account information. In some embodiments, the multiple users of the shared account may be differentiated based on the different user profiles of the shared account.

In some embodiments, an authorizing data service 122 (also referred to as a "core data service" or "authorizing data source" herein) can authorize a user account such that the user account is permitted to obtain requested content. In embodiments, the authorizing data service 122 can authorize a user account (e.g., client device associated with the user account) access to requested content, authorize delivery of the requested content to the client device, or both. Authorization of the user account to access the requested content can involve authorizing what content is accessed and who is permitted to access the content. Authorization of the delivery of the content can involve authorizing how the content is delivered.

In some embodiments, the authorizing data service can use user account information to authorize the user account. In some embodiments, a cookie associated with the client device 110 or an application of the client device 110 can be used to authorize the user account. A cookie can refer to a file that is stored at the client device 110 that holds some amount of data specific to the particular client device or application (e.g., browser). For example, a user can log-in to content sharing platform 120 using user account information. Responsive to authorizing the user account, the collaboration platform 120 can send a cookie. In subsequent requests to collaboration platform 120, the client device can include the cookie in the requests. The cookie can be used to authorize the user account. In some embodiments, the cookie can include a key-value pair that includes an encrypted version of the account information.

In some embodiments, the authorizing data service 122 is part of content sharing platform 120. In some embodiments, the authorizing data service 122 is not part of the content sharing platform 120 and hosted on a different server machine than content sharing platform 120. In other embodiments, authorizing data service 122 can be an external service, such as an authorizing service offered by a third-party.

As noted above, content distribution network (CDN) 101 can include one or more nodes, represented as server machines 112A-112Z (generally referred to as "server machine(s) 112" or "server(s) 112" herein). In embodiments, content distribution network 101 includes a geographically distributed network of servers that work together to provide fast delivery of content. The network of servers are geographically distributed to provide high availability and high performance by distributing content or services based, in some instances, on proximity to the client devices 110. The closer a CDN server is to a client device 110, the faster the content can be delivered to the client device 110.

For example, different server machines 112A-112Z can be distributed geographically within a particular country or across different countries. User A using client device 110A located in the Great Britain can request to obtain content hosted by content sharing platform 120. The request can be received by authorizing data service 122 of content sharing platform 120 and the user account associated with user A can be authorized to obtain the requested content. Subsequent to authorization, content sharing platform 120 can send a resource locator, such as a uniform resource locator (URL), to the client device 110A. A resource locator can refer to a reference that specifies a location of a resource (e.g., content) on a computer network and a mechanism for retrieving the resource. The resource locator can direct the client device 110A to obtain the content from a server machine 112 of content distribution network 101 that is located geographically proximate to client device 110A. For example, the resource locator can direct the client device 110A to obtain the requested content from a particular server machine 112 of content distribution network 101 that is also located in Great Britain. In another example, another user B using client device 110B located in the west coast of the United States requests to obtain the same content as user A. The request can be received by authorizing data service 122 of content sharing platform 120 and the user account associated with user B can be authorized to obtain the requested content. Subsequent to authorization, content sharing platform 120 can send a resource locator to the client device 110B. The resource locator can direct the client device 110B to obtain the content from a server machine 112 of content distribution network 101 that is located geographically proximate to client device 110B. For example, the resource locator can direct the client device 110B to obtain the requested content from a server machine 112 of content distribution network 101 located at the west coast of the United States.

In some embodiments, the content distribution network 101 is part of content sharing platform 120. In other embodiments, the content distribution network 101 is a third-party platform that provides CDN services to content sharing platform 120. In other embodiments, some of the content distribution network 101 can be operated by content sharing platform 120 and another part of the content distribution network 101 can be operated by a third-party. In embodiments, content distribution network 101 includes a data store, such as data store 114. Data store 114 can be similar to data store 106. Data store can include data files 116 for content, such as media content. Data store 106 can also include one or more cryptographic keys 117, such as one or more public keys or one or more private keys. Authorization module 151 can perform aspects of the disclosure described herein.

In general, functions described in one embodiment as being performed by the content sharing platform 120 or content distribution network 101 can also be performed on the client devices 110A through 110Z in other embodiments, if appropriate. In addition, the functionality attributed to a particular component can be performed by different or multiple components operating together. The content sharing platform 120 or content distribution network 101 can also be accessed as a service provided to other systems or devices through appropriate application programming interfaces, and thus is not limited to use in websites.

Although embodiments of the disclosure are discussed in terms of content sharing platforms and promoting social network sharing of a content item on the content sharing platform, embodiments may also be generally applied to any type of social network providing connections between users, or content delivery platform. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2A:
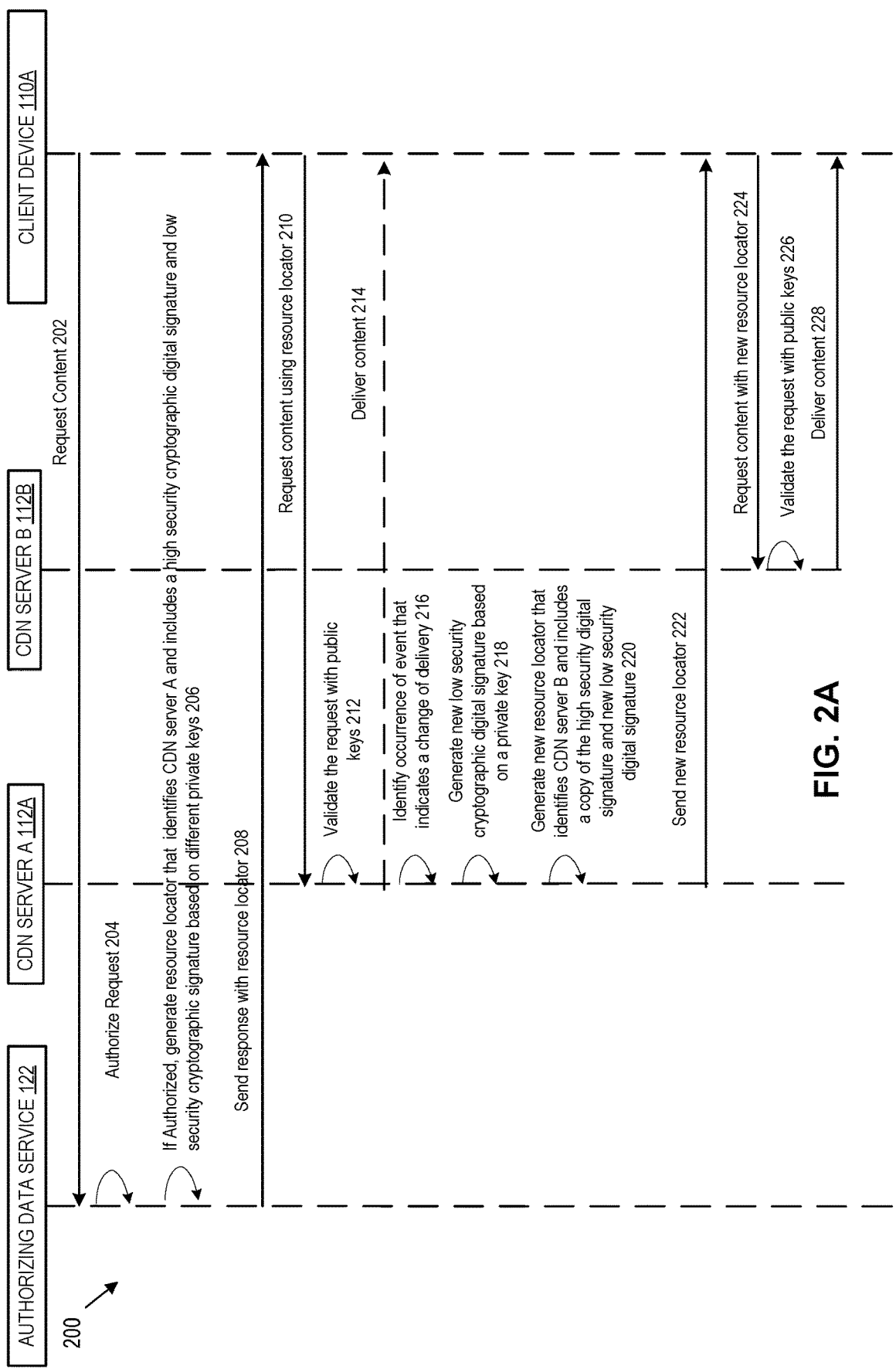
FIG. 2A is a diagram of operations for changing the delivery of content to a client device by a content distribution network using digital signatures, in accordance with embodiments of the disclosure.

FIG. 2A is a diagram of operations for changing the delivery of content to a client device by a content distribution network using digital signatures, in accordance with embodiments of the disclosure. System 200 may include similar components as system architecture 100 of FIG. 1. It may be noted that components of FIG. 1 may be used to help describe FIG. 2A. For purposes of illustration, rather than limitation, operations with respect to system 200 are described as performed by authorizing data service 122 of content sharing platform 120, server machine 112A of content distribution network 101, server machine 112B of content distribution network 101, or client device 110A may be performed by any component thereof, unless otherwise described. The operations described with respect to FIG. 2A are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 2A illustrates operations for changing the delivery of the content where the change in delivery changes the server of the content distribution network 101 that delivers the content to client device 110A.

At operation 202, client device 110A sends a request to obtain content to authorizing data service 122 of content sharing platform 120. In some embodiments, the content comprises a video item. For example, a user of client device 110A can request to play a video item that is hosted by content sharing platform 120. In some embodiments, the user can use an application, such as a browser or native application, to request the content from content sharing platform 120. In some embodiments, the request from the client device 110A to authorizing data service 122 can identify the content requested. For example, the request can include a content identifier that identifies the requested content. In some embodiments, the request from client device 110A to the authorizing data service 122 can include the format of the data to be received. For instance, the request can include a format of the video item that is compatible with the media viewer 111 at the client device 110A. In some embodiments, the request can include additional information (e.g., model, etc.) pertaining to the media viewer 111 at which the content, such as a video item, is to be played back. In some embodiments, the request can include identifiers of the client device, user, or user account attempting to obtain the content. For example, the user request can identify a username and password associated with the user account requesting to obtain the content. In another example, the request can include a cookie that identifies the client device 110A or application at the user device, which can be used to identify a particular user account.

At operation 204, authorizing data service 122 can authorize the request. To authorize the request, authorizing data service 122 determines that at least one of the client device 110A, user, or user account, is permitted to obtain the content. In some embodiments, the request can identify the account information of the user account requesting to obtain the content. For example, the account information can be encrypted in a cookie. In another example, the account information can be input by the user and provided in the request. In some embodiments, the account information, such as the username and password, can be authenticated by the authorizing data service 122 by comparing the account information (e.g., received username and password) with a stored record of the account information. If the account information of the request matches the account information of the record, the authorizing data service 122 can determine that the particular user account is authenticated. If the authenticated user account has access privileges to the requested content, the authorizing data service 122 can authorize the user account to obtain the requested content. For example, the record can identify the access privileges associated with the particular user account. If the user account has access privileges to the requested content, the authorizing data service 122 can authorize the request.

In some embodiments, the authorizing data service 122 does not authorize the request. For example, the user account information can be authenticated, but the particular user account may not have access privileges to the requested content. In embodiments, if the authorizing data service 122 does not authorize the request to obtain the content, the authorizing data service 122 can send a message to client device 110A indicating that authorization is not granted to obtain the requested content. In an embodiment, if the authorizing data service 122 does not authorize the request to obtain the content, the content sharing platform 120 can send a message to client device 110A requesting new log-in information or additional information.

In embodiments, if the authorizing data service 122 authorizes the request to obtain content, the authorizing data service 122 generates a resource locator to authorize the client device 110A to obtain the requested content from the CDN. In embodiments, the resource locator can identify the server of the content distribution network 101 that is to deliver the requested content to the client device 110A. For example, the resource locator can include a hostname, which identifies the particular server (e.g., server 112A) that can be accessed to obtain the requested content. In some embodiments, the authorizing data service 122 can generate a high security digital signature using a high security private key, and generate a low security digital signature using a low security private key. In embodiments, the high security private key and the low security private key are different private keys. In embodiments, the high security digital signature is associated with authorization of the client device 110A to access the requested content. The low security digital signature is associated with authorization of the delivery of the requested content to the client device. In embodiments, the high security private key and the low security private key are accessible by ("known" to) the content sharing platform 120, and specifically by the authorizing data service 122 of the content sharing platform 120. The high security private key is not accessible by the content distribution network 101, but the low security private key is accessible by the content distribution network 101. In embodiments, a copy of the low security private key is provided to the content distribution network 101 by the content sharing platform 120. Generation of digital signatures is further described with respect to FIG. 3A. An example of a resource locator generated by the authorizing data service 122 is described with respect to FIG. 4A.

In some embodiments, the resource locator can include low security parameters and values associated with the low security parameters. In some embodiments, to generate the low security digital signature, the values associated with the low security parameters can be concatenated. A hashing algorithm can be applied to the concatenated string to generate a hash value. The low security private key can be applied to the hash value (e.g., low security hash value) to generate the low security digital signature.

In some embodiments, the resource locator can include high security parameters and values associated with the high security parameters. In some embodiments, to generate the high security digital signature, the values associated with the high security parameters can be concatenated. A hashing algorithm can be applied to the concatenated string to generate a hash value. The high security private key can be applied to the hash value (e.g., high security hash value) to generate the high security digital signature. Low security parameters and high security parameters are further described with respect to at least FIGS. 4A-4C.

At operation 208, if the user account is authorized, authorizing data service 122 sends a response to the request for content (e.g., operation 202) to the client device 110A. In some embodiments, the response can include the resource locator that identifies server 112A of content distribution network 101 that is to deliver the content to the client device 110A. In some embodiments, the resource locator can also include the high security digital signature that is associated with the authorization of the client device 110A to access the requested content and the low security digital signature that is associated with the authorization of the delivery of the requested content for access by client device 110A. In some embodiments, the response can include one or more of a content identifier or account information. In some embodiments, the resource locator can be included in a HyperText Transfer Protocol (HTTP) response.

In an alternative embodiment at operation 208, if the user account is authorized, authorizing data service 122 also sends a response to the request for content (e.g., operation 202) to the client device 110A, but the response does not identify server 112A of the content distribution network 101 that is to deliver the content to the client device 110A. In embodiments, the response does include the high security digital signature and the low security digital signature. In some embodiments, the response identifies a manifest server. In embodiments, the manifest server is part of content distribution network 101 or content sharing platform 120. The client device 110A receives the response that identifies the manifest server and sends to the manifest server another request for the content. In embodiments, the request for content to the manifest server can include a content identifier. In embodiments, the request for content to the manifest server can include the high security digital signature and the low security digital signature. In embodiments, the manifest server can validate one or more of the high security digital signature or the low security digital signature. If the high security digital signature and the low security digital signature are validated, the manifest server can create a resource locator (e.g., manifest file).

In embodiments, the resource locator generated by the manifest server can be the same or similar as the resource locator as described above with respect operation 208. For example, the resource locator generated by the manifest server can identify server 112A of content distribution network 101 that is to deliver the content to the client device 110A. In some embodiments, the resource locator can also include the high security digital signature that is associated with the authorization of the client device 110A to access the requested content and the low security digital signature that is associated with the authorization of the delivery of the requested content for access by client device 110A. In generating the resource locator, the manifest server can use a copy of the high security digital signature, the low security digital signature, and any other relevant data (e.g., high security parameters and values and low security parameters and values) and include the copy of the information in the resource locator. The resource locator generated by the manifest server can be sent to the client device 110A. Client device 110A sends the resource locator to the CDN, such as server 112A of the CDN (e.g., operation 210).

At operation 210, client device 110A requests the content using the resource locator obtained from the authorizing data service 122. For example, the client device 110A can send an HTTP request using the resource locator. In embodiments, the request can be sent to the CDN, such as to server 112A of the content distribution network 101. In embodiments, server 112A of content distribution network 101 receives the request from the client device 110A. The request includes the resource locator as described above. In some embodiments, server 112A can be down and the request is received by another server of the content distribution network 101. The other server can perform the operations described herein, rather than for example server 112A.

At operation 212, the server 112A of the content distribution network 101 validates the high security digital signature using a high security public key and validates the low security digital signature using a low security public key. In embodiments, the high security public key and the low security public key are different public keys. Validation of digital signatures is further described with respect to FIG. 3B. In some embodiments, server 112A of content distribution network 101 validates the high security digital signature and the low security digital signature. In other embodiments, another server (e.g., validation server) of content distribution network 101 can validate the high security digital signature and low security digital signature.

At operation 214, if the high security digital signature and the low security digital signature are validated, the server 112A of the content distribution network 101 can deliver the content to the client device 110A. If the high security digital signature and the low security digital signature are not validated, the server 112A does not deliver the content to the client device 110A. In some embodiments, the server 112A is not able to deliver the content to client device 110A even though the high security digital signature and the low security digital signature have been validated. For example, the server 112A can identify an occurrence of an event that indicates a change in the delivery of the requested content (as described at operation 216) before starting the delivery of the content to client device 110A.

At operation 216, content distribution network 101 (e.g., server 112A) identifies an occurrence of an event that indicates a change in the delivery of the requested content for access by the client device. In some embodiments, the change in delivery changes the server of the content distribution network 101 that delivers the content to client device 110A. A change in delivery that changes the server of the content distribution network 101 that delivers the content to client device 110A is described with respect to FIG. 2A. In some embodiments, the change in delivery changes how the same server of the content distribution network 101 delivers the content to client device 110A. A change in delivery that changes how the same server delivers the content to the client device 110A is described with respect to FIG. 2B.

In some embodiments, identifying the occurrence of the event that indicates the change in the delivery of the requested content for access by the client device 110A includes determining that another server, server 112B of content distribution network 101, is to deliver the content to the client device 110A. In some embodiments, server 112A of content distribution network 101 determines that the server 112A is unavailable to deliver the content to the client device 110A (e.g., unable to serve the requested for content). In some embodiments, another server of the content distribution network 101 determines that server 112A is unavailable to deliver content to client device 110A. Responsive to determining that the server 112A is unavailable to deliver the content to the client device 110A, content distribution network 101 (e.g., server 112A or another server) determines that another server, such as server 112B of content distribution network 101, is to deliver the content to the client device 110A.

In embodiments, server 112A may be unavailable to deliver the content to the client device 110A (e.g., unable to serve the request for content) for any number of reasons. For example, server 112A may determine that the server is near or at an overloaded state. An overloaded state can indicate that one or more resources of the server 112A are near or at capacity. An overloaded state can be determined by one or more factors including determining whether one or more of current computational resource usage, current bandwidth usage, or current number of content requests served, exceeds a threshold. If the server 112A determines it is near at an overload state, the content distribution network 101 (e.g., server 112A) can redirect clients to other servers of the content distribution network 101. In another example, content distribution network 101 (e.g., server 112A) may determine that serving the content from the particular server 112A is not efficient. For instance, content distribution network 101 (e.g., server 112A) may determine the content is insufficiently popular at the particular server 112A and would be more efficient if the content was served by another server of the content distribution network 101 that has greater capacity. If the content distribution network 101 (e.g., server 112A) determines that serving content from the particular server 112A is not efficient, the server can redirect the client device 110A to other servers of the content distribution network 101 for delivery of the requested content.

At operation 218, responsive to identifying the occurrence of the event, content distribution network 101 (e.g., server 112A) generates a new low security digital signature associated with a changed delivery of the requested content for access by client device 110A. In some embodiments, the new low security digital signature is generated using a private key. In some embodiments, the private key used by the content distribution network 101 to generate the low security digital signature is a copy of the low security private key that the authorizing data service 122 used to generated the initial low security digital signature (e.g., operation 206).

In some embodiments, to generate the new low security digital signature associated with the changed delivery of the requested content, content distribution network 101 adjusts values associated with the low security parameters. The new low security digital signature is generated using the adjusted values associated with low security parameters and low security private key.

At operation 220, content distribution network 101 (e.g., server 112A) generates a new resource locator. As noted above, in some embodiments the change in delivery changes the server of the content distribution network 101 that delivers the content to client device 110A. In some embodiments, the new resource locator identifies another server (e.g., server 112B) of the content distribution network 101 that is to deliver the content to the client device 110A. In embodiments, the new resource locator can include a copy of the high security digital signature that was originally generated by the authorizing data service 122 and the new low security digital signature that was generated by the content distribution network 101. An example of the new resource locator that is generated responsive to determining the change of delivery that changes the server of the content distribution network 101 that delivers the content to the client device 110A is further described with respect to FIG. 4B.

At operation 222, content distribution network 101 (e.g., server 112A) provides the new resource locator to client device 110A. In some embodiments, the new resource locator includes the high security digital signature associated with authorization of the client device 110A to access the requested content and the new low security digital signature associated with the changed delivery of the requested content for access by the client device 110A. In some embodiments, the new resource locator can be sent using an HTTP redirect request. It can be noted that in some embodiments, a manifest server can be used in a similar manner at operation 222, as described with respect to operation 208.

At operation 224, client device 110A requests to access the content using the new resource locator obtained from the content distribution network 101. As noted above, the request identifies another server, server 112B of content distribution network 101 that is to deliver the content to client device 110A. In embodiments, the client device 110A can send an HTTP request that includes the new resource locator. The request can be sent to server 112B of the content distribution network 101. In embodiments, content distribution network 101 (e.g., the server 112B) receives the request from the client device 110A. The request includes the new resource locator, as described herein.

At operation 226, the content distribution network 101 (e.g., server 112B) validates the high security digital signature using a high security public key and the new low security digital signature using a low security public key. Validation of digital signatures is further described with respect to FIG. 3B. In some embodiments, server 112B of content distribution network 101 validates one or more of the high security digital signature or the low security digital signature. In some embodiments, another server (e.g., validation server) of content distribution network 101 can validate one or more of the high security digital signature or low security digital signature.

At operation 228, if the high security digital signature and the low security digital signature are validated, the server 112B of the content distribution network 101 can deliver the content to the client device 110A. If the high security digital signature and the low security digital signature are not validated, the server 112B does not deliver the content to the client device 110A.

In some embodiments, some or more of the operations can be repeated. For example, subsequent to server 112B receiving the request for content using the new resource locator, content distribution network 101 may identify an occurrence of an event that indicates another change in the delivery of the requested content. The content distribution network 101 can generate another low security digital signature and generate still another resource locator, and so forth. One or more operations as described herein can be repeated.

FIG. 2B is a diagram of operations for changing the delivery of content to a client device by a content distribution network using digital signatures, in accordance with embodiments of the disclosure. System 250 may include similar components as system architecture 100 of FIG. 1 and FIG. 2A. It may be noted that components of FIG. 1 and FIG. 2A may be used to help describe FIG. 2B. For purposes of illustration, rather than limitation, operations with respect to system 250 which are described as performed by authorizing data service 122 of content sharing platform 120, server machine 112A of content distribution network 101, or client device 110A may be performed by any component thereof, unless otherwise described. The operations described with respect to FIG. 2B are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

FIG. 2B illustrates operations for changing the delivery of the content where the change in delivery changes how the same server delivers the content to the client device 110A. It can be noted that some of the operations illustrated in FIG. 2B are the same as FIG. 2A. For the sake of clarity, operations of FIG. 2B that are the same as FIG. 2A will not be described again, and the description of operations of FIG. 2A that are the same operations of FIG. 2B can be used to describe the corresponding operations of FIG. 2B. Operations with respect to FIG. 2B that vary from FIG. 2A have been renumbered and are further described with respect to FIG. 2B.

At operation 252, content distribution network 101 (e.g., server 112A) identifies an occurrence of an event that indicates a change in the delivery of the requested content for access by the client device. In some embodiments, the change in delivery changes how the same server 112A of the content distribution network 101 delivers the content to client device 110A.

In embodiments, content distribution network 101 determines that the delivery of the requested content by the server 112A is to be changed. In some embodiments, determining the change in the delivery of the requested content by the server 112A includes determining, by the content distribution network 101 (e.g., server 112A), a change in a bit rate at which the content is to be delivered to the client device 110A. For example, the content distribution network 101 can receive information about the network connection that is accessed by the client device 110A. Content distribution network 101 can determine that the client device 110A is on a particularly fast network connection that exceeds a threshold bit rate. If the network connection exceeds the threshold bit rate, content distribution network 101 can increase the bit rate at which the content is delivered to the client device 110A. If the network connection is less than a threshold bit rate, content distribution network 101 can either keep the delivery bit rate the same or decrease the delivery bit rate. It can be noted that the bit rate can be one of the low security parameters that are part of the resource locator. It can further be noted that content distribution network 101 can change one or more of the low security parameters (but not the high security parameters). Changing the bit rate is provided for purposes of illustration, rather than limitation, and describes an example of a change in how the content is delivered to the client device 110A. Other examples of chances in how the content is delivered to the client device 110A include, but are not limited to, resolution changes, format changes, and so forth.

At operation 254, responsive to identifying the occurrence of the event, content distribution network 101 (e.g., server 112A) generates a new low security digital signature associated with a changed delivery of the requested content for access by client device 110A. In some embodiments, the new low security digital signature is generated using a private key. In some embodiments, the private key used by the content distribution network 101 to generate the low security digital signature is a copy of the low security private key that the authorizing data service 122 used to generated the initial low security digital signature (e.g. operation 206).

In some embodiments, to generate the new low security digital signature associated with the changed delivery of the requested content, content distribution network 101 adjusts values associated with the low security parameters. The new low security digital signature is generated using the adjusted values associated with low security parameters and low security private key. In some embodiments, responsive to determining the change in the bit rate at which the content is to be delivered to the client device 110A, the content distribution network 101 adjusts a bit rate parameter of the low security parameters of the resource locator received at operation 210.

At operation 256, content distribution network 101 (e.g., server 112A) generates a new resource locator. In some embodiments, the new resource locator identifies the same server (e.g., server 112A) of the content distribution network 101 that is to deliver the content to the client device 110A. In embodiments, the new resource locator can include a copy of the high security digital signature that was originally generated by the authorizing data service 122 and the new low security digital signature that was generated by the content distribution network 101. An example of the new resource locator that is generated responsive to determining the change of delivery that changes how the same server of the content distribution network 101 delivers the content to the client device 110A is further described with respect to FIG. 4C.

At operation 258, content distribution network 101 (e.g., server 112A) provides the new resource locator to client device 110A. In some embodiments, the new resource locator includes the high security digital signature associated with authorization of the client device 110A to access the requested content and the new low security digital signature associated with the changed delivery of the requested content for access by the client device 110A. In some embodiments, the new resource locator can be sent using an HTTP self-redirect request. It can be noted that in some embodiments, a manifest server can be used in a similar manner at operation 258, as described with respect to operation 208.

At operation 260, client device 110A requests to access the content using the new resource locator obtained from the content distribution network 101. As noted above, the request identifies the same server, server 112A of content distribution network 101 that is to deliver the content to client device 110A. In embodiments, the client device 110A can send an HTTP request that includes the new resource locator. The request can be sent to server 112A of the content distribution network 101. In embodiments, the server 112A of content distribution network 101 receives the request from the client device 110A. The request includes the new resource locator as described herein.

At operation 262, the content distribution network 101 (e.g., server 112A) validates the high security digital signature using a high security public key and the new low security digital signature using a low security public key. Validation of digital signatures is further described with respect to FIG. 3B. In some embodiments, server 112A of content distribution network 101 validates one or more of the high security digital signature or the low security digital signature. In some embodiments, another server (e.g., validation server) of content distribution network 101 can validate one or more of the high security digital signature or low security digital signature.

At operation 264, if the high security digital signature and the low security digital signature are validated, the server 112A of the content distribution network 101 can deliver the content to the client device 110A. If the high security digital signature and the low security digital signature are not validated, the server 112A does not deliver the content to the client device 110A.

In some embodiments, some or more of the operations can be repeated. For example, subsequent to server 112A receiving the request for content using the new resource locator, content distribution network 101 may identify an occurrence of an event that indicates another change in the delivery of the requested content. The content distribution network 101 can generate another low security digital signature and generate still another resource locator, and so forth.

It can be noted that in some embodiments, that a change in the delivery can change the server of the content distribution network 101 that delivers the content to client device 110A and how the different server of the content distribution network 101 delivers the content to client device 110A. A new low security digital signature can be created based on changes in the values of the low security parameters (e.g., bit rate parameter). The new resource locator can identify the new server (e.g., server 112B) of content distribution network 101 and the values of the low security parameters that indicate how the delivery of the content is to be changed (e.g., increased bit rate). The validation of the high security digital signature and the low security digital signature of the new resource locator can be similar as described herein.

Figure 3A:
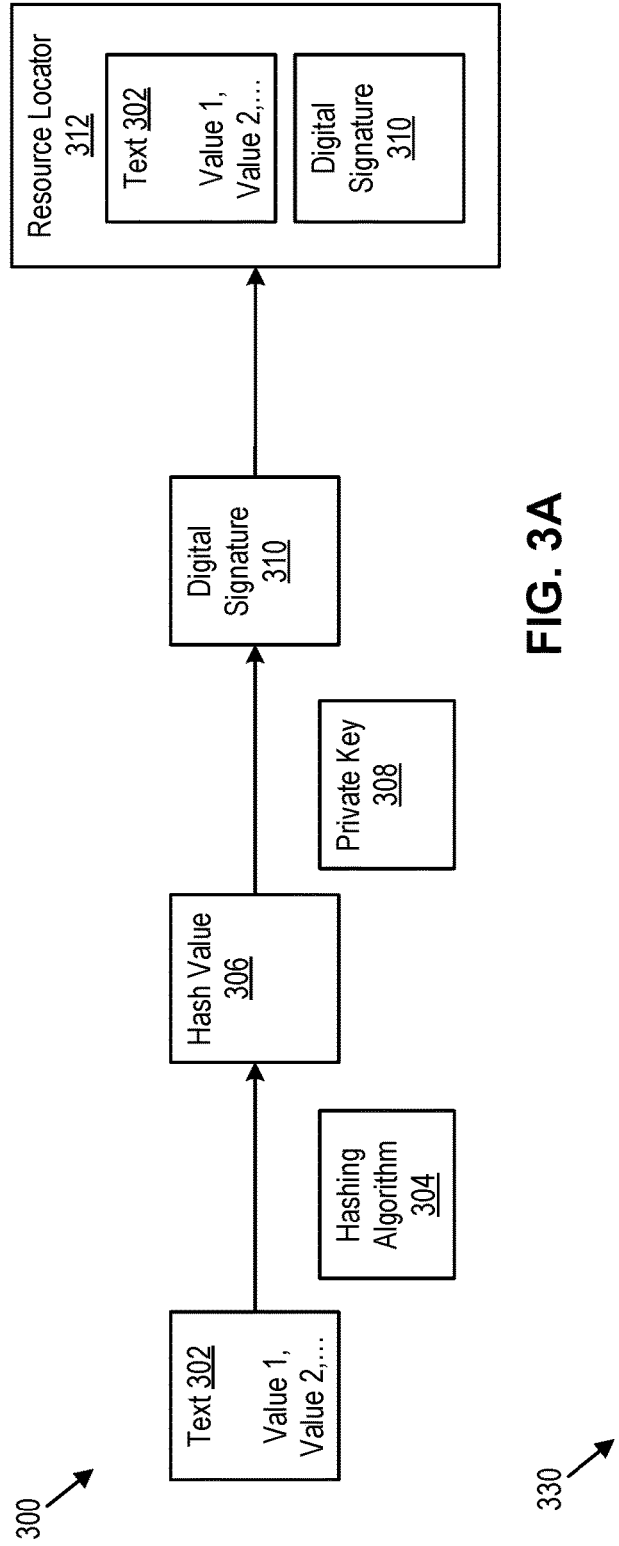
FIG. 3A is a diagram that illustrates a generation of a digital signature, in accordance with embodiments of the disclosure.

FIG. 3A is a diagram that illustrates a generation of a digital signature, in accordance with embodiments of the disclosure. Diagram 300 shows text 302. Text 302 can be a text string. In some embodiments, the text string can include concatenated values associated with low security parameters. In some embodiments, the text string can include concatenated values associated with high security parameters. In some embodiments, the values associated with the low security parameters or the values associated with the high security parameters can be hashed (e.g., applying a hashing algorithm) prior to concatenation, such that the text string is a series of concatenated hashed values of the low security parameters or high security parameters. It can be noted that a low security digital signature and a high security digital signature can be generated in a similar manner as described with respect to FIG. 3A.

At operation 304, a hashing algorithm is applied to the text 302 to produce a hash value 306. Any number of hash algorithms can be used, such as the Elliptic Curve Digital Signature (ECDS) algorithm.

At operation 308, the hash value 306 can be encrypted using a private key to generate a digital signature 310. A private key can include some code or randomly generated number. The private key is paired with a public key. The public keys can be derived from the private key. The private key (or public key) can be used with algorithms (e.g., cipher) to provide text encryption or decryption. A public key is available to many, and may be made available on an online directory. A private key is made available to the originator of the encrypted content and to entities with whom the private key is shared.

In embodiments, the resource locator 312 can include the digital signature 310 as well as the text 302 that was used to create the digital signature 310. In embodiments, the resource locator can include two digital signatures, such as a high security digital signature and low security digital signature. Generation of a single digital signature 310 is shown for purposes of illustration, rather than limitation. Similar operations as described with respect to FIG. 3A can be used to generate a high security digital signature, a low security digital signature, or both. Resource locators are further described with respect to FIGS. 4A-4C.

Figure 3B:
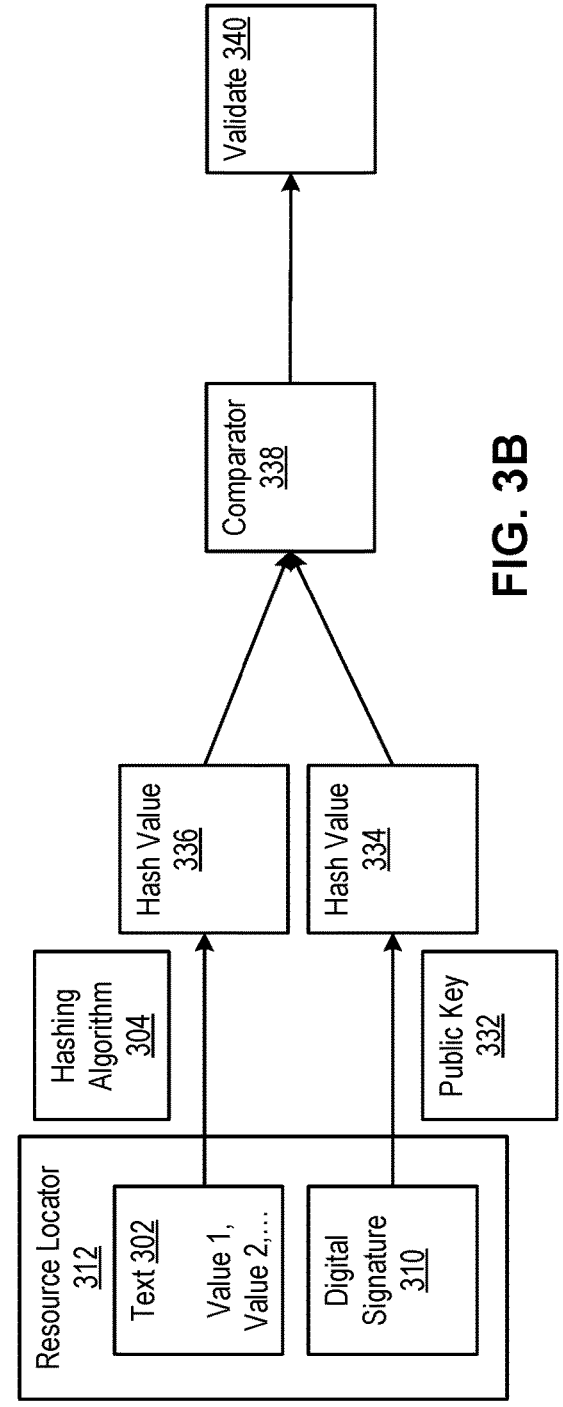
FIG. 3B is a diagram that illustrates a validation of a digital signature, in accordance with embodiments of the disclosure.

FIG. 3B is a diagram that illustrates a validation of a digital signature, in accordance with embodiments of the disclosure. Validating a digital signature is an operation for verifying the authenticity of a digital data, such as the contents of the resource locator. Validating a digital signature can provide the recipient assurances that the digital data was created by a known sender (authentication), that the sender cannot deny having sent the digital data (non-repudiation), and that the digital data was not altered in transit (integrity). It can be noted that a low security digital signature and a high security digital signature can be validated in a similar manner as described with respect to FIG. 3B.

Diagram 330 shows the resource locator 312. Resource locator includes text 302 and the digital signature 310. At operation 304, a hashing algorithm is applied to the text 302 to produce a hash value 336. The hashing algorithm can be the same hashing algorithm that is used to generate the digital signature as illustrated at FIG. 3A.

At operation 332, the digital signature 310 is decrypted using a public key to generate hash value 334. The public key can be paired with private key as illustrated at FIG. 3A.

At operation 338, hash value 336 and hash value 334 can be compared by a comparator. Hash value 336 and hash value 334 either match or do not match. At operation 340, the digital signature 310 is validated if hash value 336 and hash value 334 match. The digital signature 310 is not validated if hash value 336 and hash value 334 do not match. Validation of a single digital signature 310 is shown for purposes of illustration, rather than limitation. Similar operations as described with respect to FIG. 3B can be used to validate a high security digital signature, a low security digital signature, or both.

FIGS. 4A-4C show diagrams that illustrate resource locators, in accordance with embodiments of the disclosure. Resource locator 400 illustrates a locator that can be generated by authorizing data service 122. Resource locator 400 of FIG. 4A can include one or more portions. In some embodiments, resource locator 400 includes portion 402. Portion 402 can identify the protocol of the resource locator 400. In the current example, the protocol of resource locator 400 is Hyper Text Transfer Protocol Secure (HTTPS).

In embodiments, resource locator 400 includes portion 404 that indicates the domain name. In some embodiments, the domain name can identify the particular server (e.g., server 112A of content distribution network 101) that is to deliver the content to the requesting device (e.g., client device 110A). In the current example, the device that is indicated in portion 404 is server 112A of content distribution network 101.

In some embodiments, resource locator 400 includes portion 406 that identifies high security parameters and values of the high security parameters. In the current example, portion 406 shows high security parameter A that is associated with Value 1, high security parameter B that is associated with Value 2, and so forth. In some embodiments, portion 406 identifies low security parameters and values of the low security parameters. In the current example, portion 406 shows low security parameter X that is associated with Value 4, low security parameter Y that is associated with Value 5, and so forth. In some embodiments, the values associated with the high security parameters, low security parameters, or both are hashed values created by applying a hashing function to the non-hashed values associated with the parameters. In some embodiments, the high security parameters are different than the low security parameters.

In some embodiments, resource locator 400 includes portion 408 that identifies which high security parameters were included in generation the high security digital signature identified in the resource locator 400. In some embodiments, portion 408 identifies a sequence of the high security parameters used in the generation of the high security digital signature. In the current example, the high security parameters A, B, and so forth were used to generate the high security digital signature. The sequence is high security parameter A followed by high security parameter B, and so forth. In some examples, to generate the high security digital signature using the high security parameters A, B, and so forth, the values associated with the high security parameters are concatenated. The values of the high security parameters A, B, and so forth can be concatenated in the order identified by high security parameters of portion 408. For instance, Value A can be concatenated with Value B, which can be concatenated with another value associated with the next high security parameter in the sequence of high security parameters identified in portion 408.

In some embodiments, resource locator 400 includes portion 410 which is a high security digital signature. In the current example, the high security digital signature is shown as high security digital signature #1 that was generated based on the high security parameters as identified by portion 406 and portion 408 of resource locator 400. In some embodiments, the content sharing platform 120 generates the high security digital signature.

In some embodiments, resource locator 400 includes portion 412 that identifies which low security parameters were included in the generation of the low security digital signature. In some embodiments, portion 412 identifies a sequence of the low security parameters used in the generation of the low security digital signature. In the current example, the low security parameters X, Y, and so forth were used to generate the low security digital signature. The sequence is low security parameter X followed by low security parameter Y, and so forth. The generation of the low security digital signature is similar as described above with respect to the generation of the high security digital signature.

In some embodiments, resource locator 400 includes portion 414 which is a low security digital signature. In the current example, the low security digital signature is shown as low security digital signature #2 that was generated based on the low security parameters as identified by portion 406 and portion 412 of resource locator 400. The low security digital signature of resource locator 400 was generated by content sharing platform 120.

Resource locator 430 of FIG. 4B can include one or more portions. In some embodiments, resource locator 430 can illustrate the resource locator that is generated by the content distribution network 101. In some embodiments, resource locator 430 can represent the resource locator that content distribution network 101 generates to change the delivery of the content to client device 110A from server 112A to server 112B of content distribution network 101. It can be noted that the contents of many of the portions of resource locator 430 are similar to resource locator 400. It can be further noted that portions of resource locator 430 with contents that are the same as resource locator 400 have the same identifying numbers and are described above with respect to FIG. 4A. For purposes of clarity, portions of resource locator 430 that have new content are described with respect to FIG. 4B. In some embodiments, the content distribution network 101 changes some of the content of some of the portions of resource locator 400 to generate the new resource locator 430. The changed content is bolded for purposes of clarity.

In embodiments, resource locator 430 includes portion 434, which is similar to portion 404 of resource locator 400. Portion 434 indicates the domain name of resource locator 430. In some embodiments, the domain name can identify the particular server (e.g., server 112B that is to deliver the content to the requesting device, such as client device 110A. In the current example, the server that is indicated in portion 434 is server 112B of content distribution network 101. As illustrated, content distribution network 101 has changed the server that is to deliver content from server 112A (see portion 404) to server 112B of content distribution network 101.

In some embodiments, resource locator includes portion 436, which is similar to portion 406 of resource locator 400. Portion 436 identifies high security parameters and values of the high security parameters. In the current example, portion 436 shows high security parameter A that is associated with Value 1, high security parameter B that is associated with Value 2, and so forth. The high security parameters and values have not been changed from resource locator 400 to resource locator 430. In embodiments, content distribution network 101 does not have authority to change the high security digital signature and does not change the high security parameters and associated values of the high security parameters. If for example, content distribution network 101 did change the values of the high security parameters, content distribution network 101 would not have the private key to generate a new high security digital signature, and as such, any resource locator with the new values for the high security parameters could not be validated by the content distribution network 101.

In some embodiments, portion 436 identifies low security parameters and values of the low security parameters. In the current example, portion 436 shows low security parameter X that is associated with Value 6, low security parameter Y that is associated with Value 7, and so forth. Content distribution network 101 has changed the values of one or more of the low security parameters.

In some embodiments, resource locator 430 includes portion 444, which is similar to portion 414 of resource locator 400. Portion 444 is the low security digital signature. In the current example, the low security digital signature is shown as low security digital signature #3. Low security digital signature is generated based on the low security parameters as identified by portion 436 and portion 412 of resource locator 430. For instance, the new values of low security parameters of portion 436 are used to generate the low security digital signature, as described herein. In embodiments, content distribution network 101 generated the new low security digital signature.

Resource locator 460 of FIG. 4C can include one or more portions. In some embodiments, resource locator 460 can illustrate a resource locator that is generated by the content distribution network 101. In some embodiments, resource locator 460 can represent a resource locator that content distribution network 101 generates to change how the same server (e.g., server 112A) is to deliver the content to client device 110A. It can be noted that the contents of many of the portions of resource locator 460 are similar to resource locator 400. It can be further noted that portions of resource locator 460 with contents that are the same as resource locator 400 have the same identifying numbers and are described above with respect to FIG. 4A. For purposes of clarity, portions of resource locator 460 that have new content are described with respect to FIG. 4C. In some embodiments, the content distribution network 101 changes some of the content of some of the portions of resource locator 400 to generate the new resource locator 460. The changed content is bolded for purposes of clarity.

In some embodiments, resource locator 460 includes portion 466, which is similar to portion 406 of resource locator 400. Portion 466 identifies high security parameters and values of the high security parameters. In the current example, portion 466 shows high security parameter A that is associated with Value 1, high security parameter B that is associated with Value 2, and so forth. The high security parameters and values have not been changed from resource locator 400 to resource locator 460. In embodiments, content distribution network 101 does not have authority to change the high security digital signature and does not change the high security parameters and associated values of the high security parameters.

In some embodiments, portion 466 identifies low security parameters and values of the low security parameters. In the current example, portion 466 shows low security parameter X that is associated with Value 8, low security parameter Y that is associated with Value 9, and so forth. Content distribution network 101 has changed the values of one or more of the low security parameters. The values of the low security parameters have been changed to reflect how the delivery of the requested content is changed.

In some embodiments, resource locator 460 includes portion 474, which is similar to portion 414 of resource locator 400. Portion 474 is the low security digital signature. In the current example, the low security digital signature is shown as low security digital signature #4. Low security digital signature #4 is generated using the low security parameters as identified by portion 466 and portion 412 of resource locator 460. For instance, the new values of low security parameters of portion 466 are used to generate the low security digital signature (e.g., low security digital signature #4), as described herein.

Figure 5:
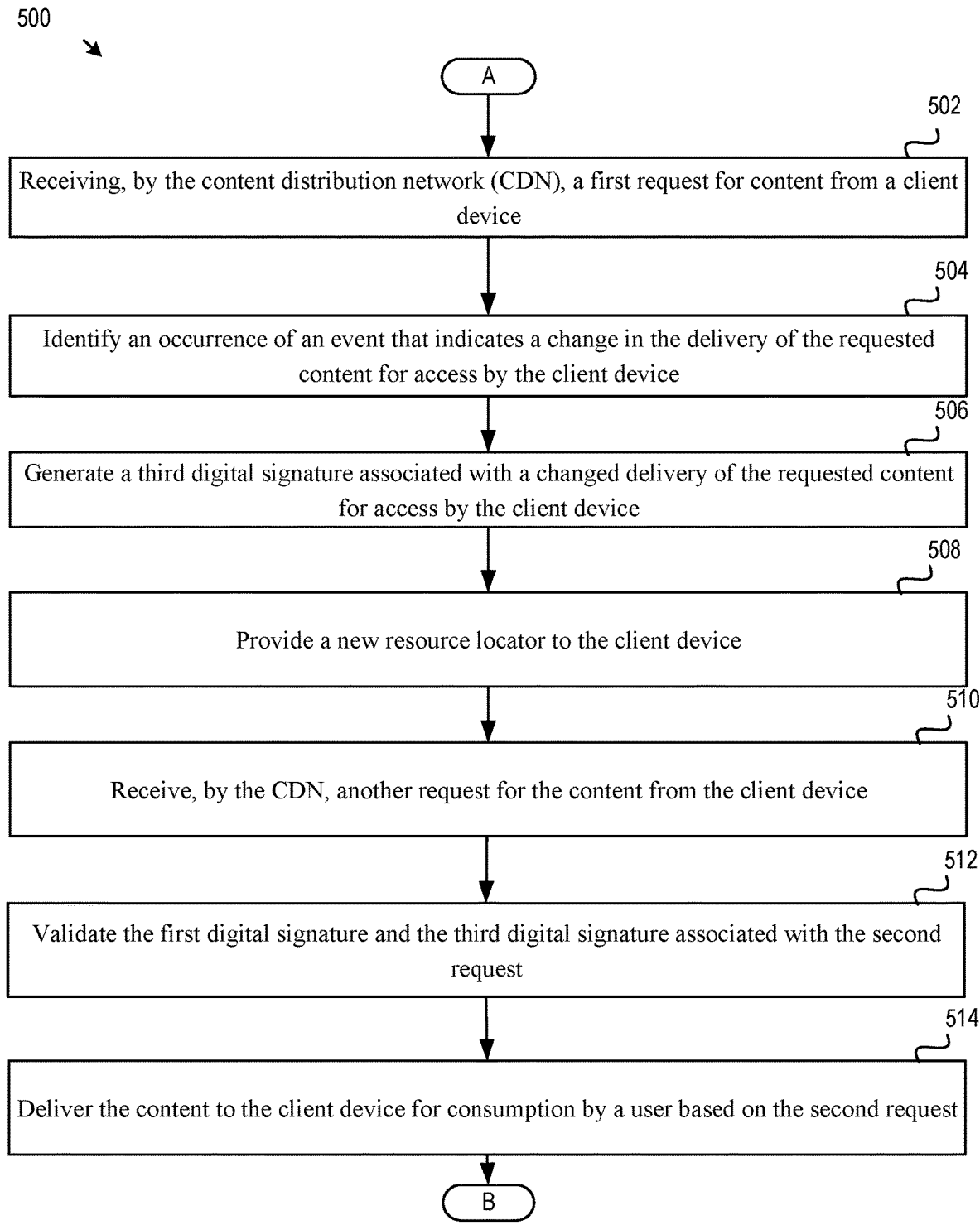
FIG. 5 depicts a flow diagram of a method for changing the delivery of the content delivered by a content distribution network, in accordance with embodiments of the disclosure.

FIG. 5 depicts a flow diagram of a method 500 for changing the delivery of the content delivered by a content distribution network, in accordance with embodiments of the disclosure. The method is performed by processing logic that may include hardware (circuitry, dedicated logic, etc.), software (e.g., instructions run on a processing device), or a combination thereof. In some embodiments, some or all the operations of method 500 may be performed by one or more components of system 100 of FIG. 1. In other embodiments, one or more operations of method 500 may be performed by an authorization module of content distribution network 101 as described with respect to FIGS. 1-2. It may be noted that components described with respect FIGS. 1-2 may be used to illustrate aspects of FIG. 5.

At block 502 processing logic implementing method 500, receives a first request for content from a client device. In embodiments, the request for content is received by a first server of content distribution network 101. In embodiments, first request includes a resource locator provided by an authorizing data service 122 to authorize the client device to obtain the requested content. In embodiments, the resource locator identifies the first server to deliver the requested content to the client device. In embodiments, the resource locator includes a first digital signature (e.g., high security digital signature) associated with authorization of the client device to access the requested content and a second digital signature (e.g., low security digital signature) associated with authorization of delivery of the requested content for access by the client device. In some embodiments, the requested content includes a video item.

In some embodiments, the first digital signature is generated by the authorizing data service 122 from a first private key (e.g., high security private key) and the second digital signature is generated by the authorizing data service 122 from a second private key (e.g., low security private key). The first private key and the second private key are different private keys. In embodiments, the first private key and the second private key are accessible by the authorizing data service 122. In embodiments, the second private key, but not the first private key, is accessible by the content distribution network 101.

In some embodiments, the first request includes first parameters (e.g., high security parameters) associated with the first digital signature and second parameters (e.g., low security parameters) associated with the second digital signature. The first digital signature is generated based on the first parameters and the second digital signature is generated based on the second parameters.

In some embodiments, responsive to receiving the first request for content from the client device, processing logic validates the first digital signature and the second digital signature associated with the first request. Responsive to validating the first digital signature and the second digital signature, processing logic delivers the content from the first server of the content distribution network 101 to the client device for consumption by a user.

At block 504, processing logic identifies an occurrence of an event that indicates a change in the delivery of the requested content for access by the client device.

In some embodiments, to identify the occurrence of the event that indicates the change in the delivery of the requested content for access by the client device, processing logic determines that a second server of the content distribution network 101 is to deliver the content to the client device. In some embodiments, to identify the occurrence of the event that indicates the change in the delivery of the requested content for access by the client device, processing logic determines that the first server of the content distribution network 101 is unavailable to deliver the content to the client device. Determining that the second server is to deliver the content to the client device is responsive to determining that the first server is unavailable to deliver the content to the client device.

In some embodiments, to identify the occurrence of the event that indicates the change in the delivery of the requested content for access by the client device, processing logic determines that the delivery of the requested content by the first server is to be changed. In embodiments, to determine that the delivery of the requested content by the first server is to be changed, processing logic determines a change in a bit rate at which the content is to be delivered to the client device. Responsive to determining the change in the bit rate at which the content is to be delivered to the client device, processing logic adjusts a bit rate parameter of the second parameters (e.g., low security parameters).

At operation 506, responsive to identifying the occurrence of the event, processing logic generates a third digital signature (e.g., new low security digital signature) associated with a change in delivery of the requested content for access by the client device. In embodiments, to generate the third digital signature associated with the change in delivery of the requested content for access by the client device, processing logic adjusts values associated with the second parameters (e.g. low security parameters). The third digital signature is generated by the content distribution network 101 using the adjusted values associated with the second parameters and the second private key.

At operation 508, processing logic provides a new resource locator to the client device. In embodiments, the new resource locator includes the first digital signature (e.g., received from authorizing data service 122) associated with authorization of the client device to access the requested content and the third digital signature associated with the changed delivery of the requested content for access by the client device.

At operation 510, processing logic receives another request (e.g., second request or third request) for the content from the client device. The request incudes the new resource locator generated by the content distribution network 101. The new resource locator includes the first digital signature and the third digital signature (e.g., new low security digital signature). In some embodiments, the request (e.g., second request) can request a different server to deliver the content to client device 110. In some embodiments, the request (e.g., third request) can request the same server to deliver the content to the client device, but request a change as to how (e.g., the manner) the content is delivered to the client device. In other embodiments, the request requests a different server to deliver the content to the client device and requests a change as to how the content is delivered to the client device.

At operation 512, processing logic validates the first digital signature and the third digital signature associated with the request.

At operation 514, responsive to validating the first digital signature and the third digital signature, processing logic delivers the content to the client device. In embodiments, if the new resource locator identifies a new server, processing logic delivers the content from the new server of the content distribution network 101 to the client device for consumption by a user. In embodiments, if new resource locator identifies the same server but changes how the content is delivered to the client device, processing logic changes the delivery of the content from the first server of the content distribution network 101 in the manner described by the new resource locator.

Figure 6:
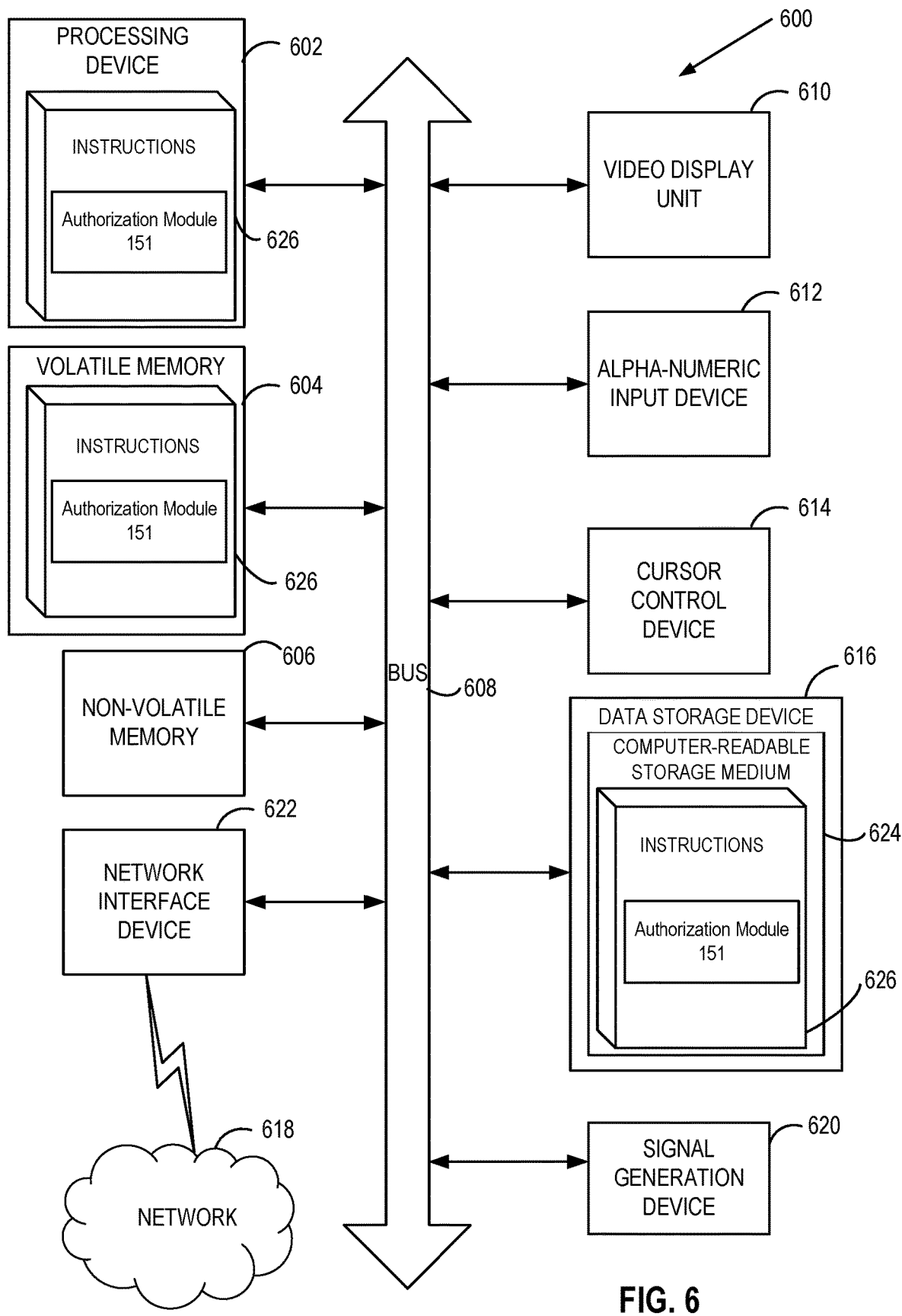
FIG. 6 is a block diagram illustrating an exemplary computer system, in accordance with an embodiment of the disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of authorization module 151. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and authorization module 151 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 or of authorization module 151 embodying any one or more of the methodologies or functions described herein. The sets of instructions of the system architecture 100 or of authorization module 151 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "adjusting", "receiving", "canceling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
receiving, by a processing device, a first request for content from a client device, wherein the first request comprises a resource locator provided by an authorizing data service to authorize the client device to obtain the requested content, the resource locator identifying a first server of a content distribution network (CDN) to deliver the requested content to the client device, and comprising a first digital signature associated with authorization of the client device to access the requested content, and a second digital signature associated with authorization of delivery of the requested content for access by the client device;

identifying an occurrence of an event that indicates a change in the delivery of the requested content for access by the client device;

responsive to identifying the occurrence of the event, generating a third digital signature associated with a changed delivery of the requested content for access by the client device; and providing a new resource locator to the client device, the new resource locator comprising the first digital signature associated with authorization of the client device to access the requested content and the third digital signature associated with the changed delivery of the requested content for access by the client device, wherein the client device is operative to access the content using the new resource locator.

2. The method of claim 1, wherein the first digital signature is generated from a first private key and the second digital signature is generated from a second private key, wherein the first private key and the second private key are different private keys, and wherein the first private key and the second private key are accessible by the authorizing data service, wherein the second private key, but not the first private key, is accessible by the CDN.

3. The method of claim 2, wherein the first request further comprises first parameters associated with the first digital signature and second parameters associated with the second digital signature, and wherein the first digital signature is generated based on the first parameters and the second digital signature is generated based on the second parameters.

4. The method of claim 3, wherein generating the third digital signature associated with the changed delivery of the requested content for access by the client device comprises:
adjusting, by the CDN, values associated with the second parameters, wherein the third digital signature is generated by the CDN using the adjusted values associated with the second parameters and the second private key.

5. The method of claim 1, wherein identifying the occurrence of the event that indicates the change in the delivery of the requested content for access by the client device comprises:
determining that a second server of the CDN is to deliver the content to the client device, wherein the new resource locator identifies that second server of the CDN.

6. The method of claim 5, wherein identifying the occurrence of the event that indicates the change in the delivery of the requested content for access by the client device further comprises:
determining that the first server of the CDN is unavailable to deliver the content to the client device, wherein determining that the second server is to deliver the content to the client device is responsive to determining that the first server is unavailable to deliver the content to the client device.

7. The method of claim 5, further comprising:
receiving, by the second server of the CDN, a second request for the content from the client device, the second request comprising the new resource locator;

validating the first digital signature and the third digital signature associated with the second request; and
responsive to validating the first digital signature and the third digital signature, delivering the content from the second server of the CDN to the client device for consumption by a user.

8. The method of claim 1, wherein identifying the occurrence of the event that indicates the change in the delivery of the requested content for access by the client device comprises:
determining that the delivery of the requested content by the first server is to be changed.

9. The method of claim 8, wherein determining that the delivery of the requested content by the first server is to be changed further comprises:
determining a change in a bit rate at which the content is to be delivered to the client device; and
responsive to determining the change in the bit rate at which the content is to be delivered to the client device, adjusting a bit rate parameter, wherein the third digital signature is generated using the adjusted bit rate parameter.

10. The method of claim 8, further comprising:
receiving a third request for the content from the client device, the third request comprising the new resource locator;
validating the first digital signature and the third digital signature associated with the third request; and
responsive to validating the first digital signature and the third digital signature, changing the delivery of the content from the first server of the CDN in view of the third request.

11. The method of claim 1, further comprising:
responsive to receiving the first request for content from the client device, validating the first digital signature and the second digital signature associated with the first request; and
responsive to validating the first digital signature and the second digital signature, delivering the content from the first server of the CDN to the client device for consumption by a user.

12. The method of claim 1, wherein the content comprises a video item.

13. A system comprising:
a memory; and
a processing device, coupled to the memory, to:
receive a first request for content from a client device, wherein the first request comprises a resource locator provided by an authorizing data service to authorize the client device to obtain the requested content, the resource locator identifying a first server of a content distribution network (CDN) to deliver the requested content to the client device, and comprising a first digital signature associated with authorization of the client device to access the requested content, and a second digital signature associated with authorization of delivery of the requested content for access by the client device;
identifying an occurrence of an event that indicates a change in the delivery of the requested content for access by the client device;
responsive to identifying the occurrence of the event, generating a third digital signature associated with a changed delivery of the requested content for access by the client device; and
providing a new resource locator to the client device, the new resource locator comprising the first digital signature associated with authorization of the client device to access the requested content and the third digital signature associated with the changed delivery of the requested content for access by the client device, wherein the client device is operative to access the content using the new resource locator.

14. The system of claim 13, wherein the first digital signature is generated from a first private key and the second digital signature is generated from a second private key, wherein the first private key and the second private key are different private keys, and wherein the first private key and the second private key are accessible by the authorizing data service, wherein the second private key, but not the first private key, is accessible by the CDN.

15. The system of claim 13, wherein to identify the occurrence of the event that indicates the change in the delivery of the requested content for access by the client device, the processing device is operative to:
 determine that a second server of the CDN is to deliver the content to the client device, wherein the new resource locator identifies that second server of the CDN.

16. The system of claim 15, wherein to identify the occurrence of the event that indicates the change in the delivery of the requested content for access by the client device, the processing device is further operative to:
 determine that the first server of the CDN is unavailable to deliver the content to the client device, wherein determining that the second server is to deliver the content to the client device is responsive to determining that the first server is unavailable to deliver the content to the client device.

17. The system of claim 15, the processing device being further operative to:
 receive, by the second server of the CDN, a second request for the content from the client device, the second request comprising the new resource locator;
 validate the first digital signature and the third digital signature associated with the second request; and
 responsive to validating the first digital signature and the third digital signature, deliver the content from the second server of the CDN to the client device for consumption by a user.

18. A non-transitory computer-readable medium comprising instructions that, responsive to execution by a processing device, cause the processing device to perform operations comprising:
 receiving, by the processing device, a first request for content from a client device, wherein the first request comprises a resource locator provided by an authorizing data service to authorize the client device to obtain the requested content, the resource locator identifying a first server of a content distribution network (CDN) to deliver the requested content to the client device, and comprising a first digital signature associated with authorization of the client device to access the requested content, and a second digital signature associated with authorization of delivery of the requested content for access by the client device;
 identifying an occurrence of an event that indicates a change in the delivery of the requested content for access by the client device;
 responsive to identifying the occurrence of the event, generating a third digital signature associated with a changed delivery of the requested content for access by the client device; and
 providing a new resource locator to the client device, the new resource locator comprising the first digital signature associated with authorization of the client device to access the requested content and the third digital signature associated with the changed delivery of the requested content for access by the client device, wherein the client device is operative to access the content using the new resource locator.

19. The non-transitory computer-readable medium of claim 18, wherein identifying the occurrence of the event that indicates the change in the delivery of the requested content for access by the client device comprises:
 determining that the first server of the CDN is unavailable to deliver the content to the client device; and
 responsive to determining that the first server is unavailable to deliver the content to the client device, determining that a second server of the CDN is to deliver the content to the client device, wherein the new resource locator identifies that second server of the CDN.

20. The non-transitory computer-readable medium of claim 19, further comprising:
 receiving, by the second server of the CDN, a second request for the content from the client device, the second request comprising the new resource locator;
 validating the first digital signature and the third digital signature associated with the second request; and
 responsive to validating the first digital signature and the third digital signature, delivering the content from the second server of the CDN to the client device for consumption by a user.

* * * * *